United States Patent [19]
Sano et al.

[11] Patent Number: 5,117,326
[45] Date of Patent: May 26, 1992

[54] MONOLITHIC CERAMIC CAPACITOR

[75] Inventors: Harunobu Sano, Kyoto; Nagato Omori; Yoshiaki Kohno, both of Nagaokakyo; Yukio Sakabe, Kyoto, all of Japan

[73] Assignee: Murata Manufacturing Co., Ltd., Japan

[21] Appl. No.: 504,244

[22] Filed: Apr. 4, 1990

[30] Foreign Application Priority Data

Apr. 5, 1989 [JP] Japan ................ 1-87563

[51] Int. Cl.$^5$ ............... H01G 4/06; C04B 35/46
[52] U.S. Cl. ................... 361/321; 264/61; 501/137
[58] Field of Search ............ 361/320, 321, 322, 328, 361/329, 330, 308, 309, 310; 501/136–139; 264/61; 29/25.42

[56] References Cited

U.S. PATENT DOCUMENTS

| | | | |
|---|---|---|---|
| 4,115,493 | 9/1978 | Sakabe et al. | 264/61 |
| 4,353,153 | 10/1982 | Prakash | 29/25.42 |
| 4,461,844 | 7/1984 | Itakura et al. | 501/137 |
| 4,506,026 | 3/1985 | Hodgkins et al. | 501/135 |
| 4,607,018 | 8/1986 | Nishioka et al. | 501/135 |
| 4,607,316 | 8/1986 | Wada et al. | 361/321 |
| 4,610,971 | 9/1986 | Wada et al. | 501/137 |
| 4,713,726 | 12/1987 | Sasazawa | 361/321 |
| 4,845,062 | 7/1989 | Burn | 501/136 |
| 4,959,333 | 9/1990 | Mori et al. | 501/136 |

Primary Examiner—Donald A. Griffin
Attorney, Agent, or Firm—Ostrolenk, Faber, Gerb & Soffen

[57] ABSTRACT

A monolithic ceramic capacitor is characterized in that dielectric ceramic layers are made up of a dielectric ceramic composition consisting essentially of a basic composition and an antireducing agent incorporated therein to prevent it from reduction. The basic composition mainly comprises barium titanate and a bismuth compound incorporated therein, and the internal electrodes comprises a copper or a copper alloy. The antireducing agent has a composition expressed by the general formula:

$$\alpha MnO_2 + \beta RO + \gamma B_2O_3 + (1 - \alpha - \beta - \gamma)SiO_2, \text{ or}$$
$$\alpha Li_2O + \beta RO + \gamma B_2O_3 + (1 - \alpha - \beta - \gamma)SiO_2, \text{ or}$$
$$\alpha ZnO + \beta RO + \gamma B_2O_3 + (1 - \alpha - \beta - \gamma)SiO_2$$

wherein RO is at least one oxide selected from the group consisting of MgO, CaO, SrO and BaO, $\alpha$, $\beta$ and $\gamma$ are molar percentages of the respective components and take a value within the following respective ranges, $5 \leq \alpha \leq 20$, $10 \leq \beta \leq 60$, $20 \leq \gamma \leq 35$. The internal electrode may contain at least one additive selected from the group consisting of glass frit, powered dielectric and antireducing agent.

9 Claims, 1 Drawing Sheet

MONOLITHIC CERAMIC CAPACITOR

BACKGROUND OF THE INVENTION

1. Field of the Invention

The present invention relates to a monolithic ceramic capacitor.

2. Description of the Prior Art

Monolithic ceramic capacitors generally comprise plural dielectric ceramic layers united to one another to form a monolithic body, a plurality of internal electrodes each formed between two adjacent dielectric ceramic layers, and external electrodes formed on opposite sides of said monolithic body and connected to the alternate internal electrodes.

As a dielectric material for monolithic ceramic capacitors, there have widely been used high permittivity dielectric ceramic compositions of a barium titanate system, especially, those comprising a main component of barium titanate and a small amount of a bismuth compound such as bismuth titanate, bismuth stannate, bismuth zirconate, or the like, incorporated therein as a secondary component. Such dielectric ceramic compositions of a barium titanate system are disclosed in various patent specifications. For example, Japanese patent publication No. 55-48644 discloses a dielectric material of a system, $BaTiO_3 + Bi_2O_3.SnO_2 + Nd_2O_3$. Japanese patent laid-open No. 60-31793 discloses a dielectric material of a system, $BaTiO_3 + Bi_2O_3.SnO_2 + CaZrO_3 + MgTiO_3 + CeO_2$. Japanese patent publication No. 56-45242 discloses a dielectric material of a system, $BaTiO_3 + Bi_2O_3.ZrO_2 + CeO_2$.

The dielectric layers of monolithic ceramic capacitors are generally manufactured by firing the above dielectric material at about 1200° C. Since the internal electrodes are subjected to such a high sintering temperature of the dielectric material, a material for internal electrodes is required to have a high melting point and high resistance to oxidation at high temperatures. To this end, noble metals such as platinum and silver-palladium alloys have been used as a material for internal electrodes.

However, use of such noble metal results in increase of production cost of the monolithic ceramic capacitors. In addition, if any silver-palladium alloy is used as the internal electrode material, it causes migration of silver into the ceramic layers, resulting in lowering of the electrical properties of the capacitors. Further, the internal electrodes of platinum cause increase of equivalent series resistance of capacitors because of low conductivity of platinum.

One idea to solve these problems is to use copper or a copper alloy as a material for internal electrodes as these materials are low in price but high in conductivity. However, it is impossible to use copper or its alloy as an internal electrode material together with the dielectric ceramic compositions of the prior art since copper and alloys thereof have low melting points and are easy to oxidize. If the dielectric ceramic composition is fired in a reducing atmosphere in order to use copper or a copper alloy as a internal electrode material, barium titanate and bismuth oxide in the bismuth compound are reduced during firing, resulting in lowering of the insulating resistance. Thus, it is impossible to use copper or copper alloys as a material for internal electrodes.

SUMMARY OF THE INVENTION

It is therefore an object of the present invention to provide a monolithic ceramic capacitor which is inexpensive and free from lowering of characteristics during manufacture.

According to the present invention, there is provided a monolithic ceramic capacitor comprising a plurality of dielectric ceramic layers united to one another to form a monolithic body, a plurality of internal electrodes each formed between two adjacent dielectric ceramic layers, and external electrodes formed on opposite sides of said monolithic body and each being connected to alternate internal electrodes, characterized in that said dielectric ceramic layers are made up of a dielectric ceramic composition consisting essentially of a basic composition and an antireducing agent incorporated therein to prevent it from reduction, said basic composition mainly comprising barium titanate and a bismuth compound incorporated therein, and in that said internal electrodes comprise copper or a copper alloy.

As a basic composition for dielectric layers of the monolithic ceramic capacitor, there may be used any one of the barium titanate based dielectric ceramic compositions of the prior art such as, for example, a dielectric ceramic composition of a system, $BaTiO_3 + Bi_2O_3.SnO_2 + Nd_2O_3$, or of a system, $BaTiO_3 + Bi_2O_3.SnO_2 + CaZrO_3 + MgTiO_3 + CeO_2$, or of a system, $BaTiO_3 + Bi_2O_3.ZrO_2 + CeO_2$, or the like. It is, however, preferred to use a dielectric ceramic composition expressed by the general formula:

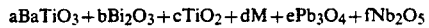

$$aBaTiO_3 + bBi_2O_3 + cTiO_2 + dM + ePb_3O_4 + fNb_2O_5$$

where M is at least one oxide selected from the group consisting of $La_2O_3$, $CeO_2$, $Nd_2O_3$, $Sm_2O_3$ and $Nd_2O_3$, and a, b, c, d, e and f are weight percentages of the respective components and take a value within the following respective ranges: $60.0 \leq a \leq 98.0$, $1.0 \leq b \leq 15.0$, $0.2 \leq c \leq 20.0$, $0.2 \leq d \leq 8.0$, $0.2 \leq e \leq 15.0$, $0.2 \leq f \leq 5.0$.

As an antireducing agent which prevents the basic composition from reduction during firing, there may be used those expressed by the general formula:

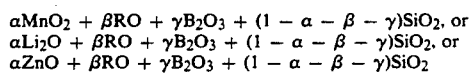

$$\alpha MnO_2 + \beta RO + \gamma B_2O_3 + (1 - \alpha - \beta - \gamma)SiO_2, \text{ or}$$
$$\alpha Li_2O + \beta RO + \gamma B_2O_3 + (1 - \alpha - \beta - \gamma)SiO_2, \text{ or}$$
$$\alpha ZnO + \beta RO + \gamma B_2O_3 + (1 - \alpha - \beta - \gamma)SiO_2$$

wherein RO is at least one oxide selected from the group consisting of MgO, CaO, SrO and BaO, $\alpha$, $\beta$ and $\gamma$ are molar percentages of the respective components and take a value within the following respective ranges, $5 \leq \alpha \leq 20$, $10 \leq \beta \leq 60$, $20 \leq \gamma \leq 35$.

The incorporation of the above antireducing agent into the basic composition lowers its sintering temperature and prevents it from reduction during firing in a reducing atmosphere, thus making it possible to use copper or a copper alloy as a material for internal electrodes. In addition, the use of copper or copper alloy as a material for internal electrodes makes it possible to prevent the dielectric layers from migration of the internal electrode material, as well as to reduce production cost of the monolithic ceramic capacitors.

As a material for internal electrodes, there may be used those such as copper and copper alloys. In a preferred embodiment, the internal electrodes comprising copper or a copper alloy may be incorporated with at least one additive selected from the group consisting of glass flit, aforesaid powdered basic composition, and aforesaid powdered antireducing agent. The glass frit includes lead borosilicate, bismuth borosilicate, and the like. The incorporation of such an additive into copper internal electrodes makes it possible to prevent the monolithic ceramic capacitors from delamination between adjacent dielectric layers. In this case, the sum of the contents of additives in the internal electrodes should be not more than 40 wt %as excess addition of these additives lowers the characteristics of the capacitors.

As a material for the external electrodes, electrode material such as copper, copper alloys, silver, palladium and silver-palladium alloys may be used. In the double external electrodes disclosed herein, the pairs of electrode may be made up of material different from each other as the occasion demands.

The above and other objects, features and advantages of the present invention will become apparent from the following description, taken in connection with the accompanying drawings which shows, by way of example only, preferred embodiments thereof.

DETAILED EXPLANATION OF THE PREFERRED EMBODIMENTS

Figure 1:
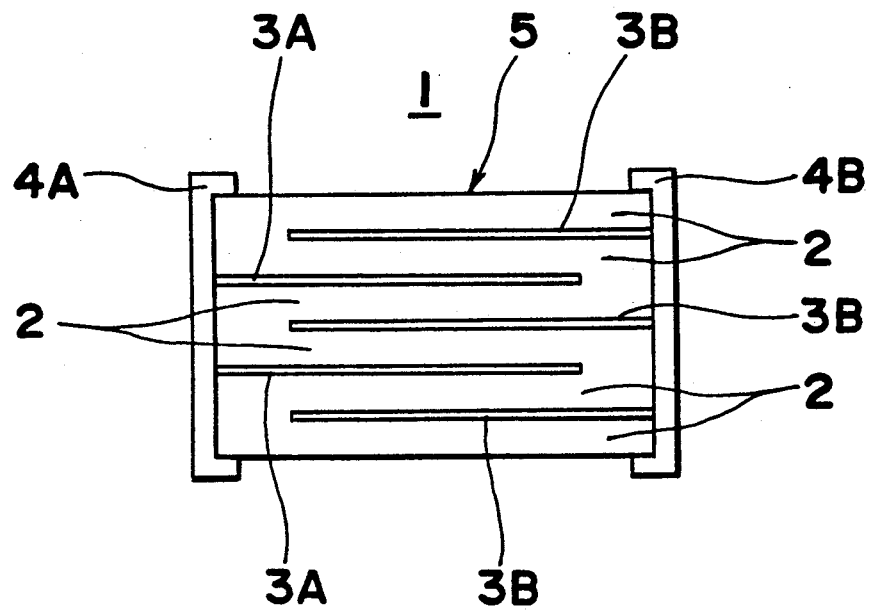
FIG. 1 is a section view of a monolithic ceramic capacitor embodying the present invention.

Referring now to FIG. 1, there is shown a monolithic ceramic capacitor 1 embodying the present invention. The capacitor 1 comprises a plurality of dielectric ceramic layers 2 stacked and united into a monolithic body, plural internal electrodes 3A, 3B alternately formed between adjacent dielectric ceramic layers 2, and external electrodes 4A, 4B formed on opposite sides of a monolithic ceramic body 5. The dielectric layers are made up of a dielectric ceramic composition consisting essentially of a barium titanate based basic composition and an antireducing agent incorporated therein, said basic composition mainly comprising barium titanate and a bismuth compound. The alternate internal electrodes 3A are connected to the external electrode 4A on one side of the ceramic body 5, whereas the other alternate internal electrodes 3B are connected to the other external electrode 4B on the opposite side of the ceramic body 5. The internal electrodes have a thickness ranging from 0.5 to 5 $\mu$m, and the external electrodes generally have a thickness ranging from about 10 to 80 $\mu$m.

The above monolithic ceramic capacitor may be produced by preparing ceramic green sheets, forming a metal paste layer for an internal electrode on one flat surface of each ceramic green sheet, stacking and pressing the green sheets with heat to form a multilayer green ceramic body, firing it to form a monolithic sintered ceramic body with internal electrodes, forming metal paste layers for external electrodes on opposite sides of the monolithic sintered ceramic body, and baking it at a suitable temperature to form external electrodes.

The above ceramic green sheets may be prepared in the following manner: A powder of dielectric ceramic composition and an antireducing agent are weighed and mixed in the predetermined ratio, and the resultant mixture is milled in a ball mill by the wet process together with an organic binder of polyvinyl butyral resin and an organic solvent such as ethyl alcohol, and formed into sheets by use of a doctor blade.

Figure 2:
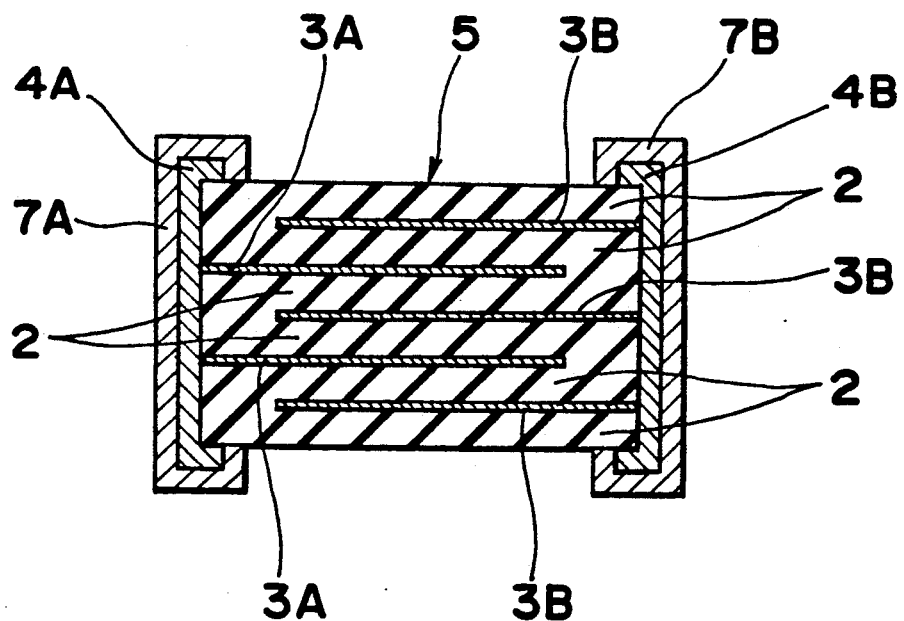
FIG. 2 is a section view of a monolithic ceramic capacitor, showing another embodiment of the present invention.

The above monolithic ceramic capacitors may be modified as shown in FIG. 2. In this embodiment, the external electrodes 4A and 4B are covered with second layers 7A, 8A of another conducting material such as, for example, silver.

The metal paste for the internal electrodes or that for external electrodes may be prepared by dispersing metal powder of about 0.1 to 5 $\mu$m in a varnish such as ethyl cellulose dissolved in a solvent such as $\alpha$-terpineol.

EXAMPLE 1

Using $BaCO_3$, $TiO_2$, $Bi_2O_3$, $La_2O_3$, $CeO_2$, $Nd_2O_3$, $Sm_2O_3$, $Y_2O_3$, $Pb_3O_4$ and $Nb_2O_5$ as raw materials, there was prepared a powdered basic composition for a dielectric material in the following manner: Firstly, $BaCO_3$ and $TiO_2$ were mixed in the molar weight of 1:1, calcined at 1100° to 1250° C., and then ground to prepare fine powder of $BaTiO_3$. The resultant fine powder of $BaTiO_3$ some of and the remaining raw materials, $Bi_2O_3$, $TiO_2$, $La_2O_3$, $CeO_2$, $Nd_2O_3$, $Sm_2O_3$, $Y_2O_3$, $Pb_3O_4$ and $Nb_2O_5$ were weighed and mixed so that the product has a composition consisting of 89.1 wt % of $BaTiO_3$, 5.3 wt % of $Bi_2O_3$, 0.8 wt % of $TiO_2$, 1.3 wt % of $CeO_2$, 1.8 wt % of $Pb_3O_4$ and 1.7 wt % of $Nb_2O_5$. The resultant mixture was wet-milled for 16 hours with a ball mill, dried by evaporation, crushed and then ground to pass a 200 mesh sieve.

Separate from the above, there were prepared antireducing agents expressed by the general formula:

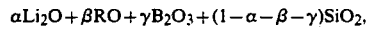

$\alpha Li_2O + \beta RO + \gamma B_2O_3 + (1-\alpha-\beta-\gamma)SiO_2$, wherein RO is at least one oxide selected from the group consisting of MgO, CaO, SrO and BaO, $\alpha$, $\beta$ and $\gamma$ are molar percentages of the respective components and take a value within the following respective ranges, $5 \leq \alpha \leq 20$, $10 \leq \beta \leq 60$, $20 \leq \gamma \leq 35$, in the following manner.

Raw materials, $Li_2CO_3$, $MgCO_3$, $CaCO_3$, $SrCO_3$, $BaCO_3$, $B_2O_3$ and $SiO_2$, were weighed and mixed in the ratio shown in Table 1A, and milled by the wet process with a ball mill for 16 hours and then dried by evaporation. The resultant mixture was put into an aluminum crucible, maintained at 1300° C. for 1 hour, vitrified by rapid cooling, and then ground to pass a 200 mesh sieve.

Each thus prepared antireducing agent was mixed with the above powdered basic composition in the ratio shown in Table 1A. In the table, the basic composition is symbolized by X, and the antireducing agent is Y. The resultant mixture was wet-milled with a ball mill for 16 hours together with a suitable amount of polyvinyl butyral resin dissolved in ethyl alcohol to prepare a slurry, which was then formed into a sheet by the doctor blade process, dried and then cut into suitable size to prepare ceramic green sheets.

Each ceramic green sheet was provided on its one flat surface with a pattern of an internal electrode by screen-printing with copper paste. The copper paste was prepared by dispersing copper powder of about 0.1 to 5 $\mu$m in ethyl cellulose solution dissolved in $\alpha$-terpineol. Subsequently, 17 sheets of the resultant printed green sheets were stacked, pressed and then cut into pieces to form green units for monolithic ceramic capacitors. The green units were fired with an electric furnace at various temperatures ranging from 830° to 1050° C. for 2 hours in a reducing atmosphere composed of a mixed gas of $N_2$, $H_2$ and $H_2O$ to produce monolithic sintered ceramic capacitor units. During firing, the firing atmosphere was kept constant by feeding $N_2$, $H_2$ and $H_2O$ into the furnace at a rate of 3000 l/hr for $N_2$, 0.1 l/hr for $H_2$, and 1350 l/hr for $H_2O$.

Some of the resultant capacitor units were immersed in a fuchsin solution to determine the optimum firing temperature (i.e., sintering temperature) for each composition. Results are shown in Table 1B.

Each capacitor unit prepared by firing at the optimum firing temperature was provided on its opposite sides with external electrodes as terminations by applying a silver paste and then baking it at 800° C. for 30 minutes in a nitrogen atmosphere to produce a monolithic ceramic capacitor.

The dimensions of the monolithic ceramic capacitor are as follows:
  Width: 4.8 mm
  Length: 5.6 mm
  Thickness: 1.2 mm
  Effective thickness of dielectric layer: 32 μm
  Number of dielectric layers: 17 sheets
  Thickness of internal electrode: 3 μm
  Surface area of internal electrode: 21.5 mm$^2$
  Thickness of external electrode: 60 μm For each specimen, measurements were made on electrical characteristics including dielectric constant (ε) at 25° C., 1 KHz and 1 Vrms, dielectric loss (tan δ), insulating resistance (ρ), and temperature characteristics of capacitance (T.C.C.) over the temperature range of −25° C. to 85° C. relative to the capacitance at 20° C. Results are shown in Table 1B together with those for comparative specimens Nos. 13 and 14.

Comparative specimen No. 13 was prepared in the same manner as above, except that ceramic green sheets were prepared only with the powder of the dielectric ceramic composition prepared in Example 1. Thus, the dielectric ceramic layer consists of 89.1 wt % of $BaTiO_3$, 5.3 wt % of $Bi_2O_3$, 0.8 wt % of $TiO_2$, 1.3 wt % of $CeO_2$, 1.8 wt % of $Pb_3O_4$ and 1.7 wt % of $Nb_2O_3$, and contains no antireducing agent.

The comparative specimen No. 14 was prepared in the same manner as above, except that the ceramic green sheets were prepared by the use of a mixture consisting of 96 wt % of the powder of the dielectric ceramic composition prepared in Example 1 and 4 wt % of a low temperature sintering additive consisting of 27.9 mol % of $Li_2O$, 7.4 mol % of BaO, 5.6 mol % of CaO, 5.6 mol % of SrO, 44.5 mol % of $SiO_2$, 2.0 mol % of $TiO_2$ and 7.0 mol % of CuO.

In Table 1B, the temperature characteristic of capacitance (T.C.C.) is classified by a temperature change rate of capacitance on the basis of the characteristics A, B, C and D established by JIS (Japanese Industrial Standard), which are given as follows:

A characteristics: the temperature change rate of capacitance over the temperatures range of −25° C. to +85° C. relative to the capacitance at 20° C. is within the range of ±5%;

B characteristics: A temperature change rate of capacitance over the temperatures range of −25° C. to +85° C. relative to the capacitance at 20° C. is within the range of ±10%;

C characteristics: A temperature change rate of capacitance over the temperatures range of −25° C. to +85° C. relative to the capacitance at 20° C. is within the range of ±20%;

D characteristics: A temperature change rate of capacitance over the temperatures range of −25° C. to +85° C. relative to the capacitance at 20° C. is within the range of −30% to +20%.

In Tables 1A and 1B, specimens with an asterisk (*) are those out of the scope of the present invention, whereas other specimens are those falling in the scope of the present invention.

TABLE 1A

| No. | dielectric material (wt %) X | dielectric material (wt %) Y | Antireducing agent (mol %) Li$_2$O | BaO | CaO | SrO | MgO | B$_2$O$_3$ | SiO$_2$ |
|---|---|---|---|---|---|---|---|---|---|
| 1 | 98 | 2 | 6 | 54 | 0 | 0 | 0 | 20 | 20 |
| 2 | 98 | 2 | 5 | 5 | 5 | 5 | 5 | 25 | 50 |
| 3 | 98 | 2 | 5 | 10 | 10 | 5 | 5 | 35 | 30 |
| 4 | 98 | 2 | 6 | 0 | 10 | 0 | 0 | 34 | 50 |
| 5 | 98 | 2 | 20 | 5 | 5 | 5 | 5 | 30 | 30 |
| 6 | 98 | 2 | 5 | 15 | 15 | 10 | 5 | 20 | 30 |
| 7 | 96 | 4 | 5 | 15 | 15 | 10 | 5 | 20 | 30 |
| 8 | 94 | 6 | 5 | 15 | 15 | 10 | 5 | 20 | 30 |
| 9 | 92 | 8 | 5 | 15 | 15 | 10 | 5 | 20 | 30 |
| 10 | 90 | 10 | 5 | 15 | 15 | 10 | 5 | 20 | 30 |
| 11 | 85 | 15 | 5 | 15 | 15 | 10 | 5 | 20 | 30 |
| 12 | 80 | 20 | 5 | 15 | 15 | 10 | 5 | 20 | 30 |
| 13* | 100 | 0 | — | — | — | — | — | — | — |
| 14* | 96 | (4) | — | — | — | — | — | — | — |

TABLE 1B

| No. | Sinter temp. (°C.) | ε | tan δ (%) | ρ (Ωcm) | T.C.C. |
|---|---|---|---|---|---|
| 1 | 1010 | 2200 | 1.0 | >10$^{10}$ | B |
| 2 | 1030 | 2000 | 1.2 | >10$^{10}$ | B |
| 3 | 1050 | 2100 | 1.0 | >10$^{10}$ | B |
| 4 | 1000 | 2100 | 1.5 | >10$^{10}$ | B |
| 5 | 1000 | 1900 | 1.0 | >10$^{10}$ | B |
| 6 | 1020 | 2000 | 1.1 | >10$^{10}$ | B |
| 7 | 990 | 1800 | 0.9 | >10$^{10}$ | B |
| 8 | 970 | 1600 | 1.3 | >10$^{10}$ | A |
| 9 | 950 | 1300 | 1.0 | >10$^{10}$ | A |
| 10 | 910 | 1000 | 0.8 | >10$^{10}$ | A |
| 11 | 890 | 800 | 1.0 | >10$^{10}$ | A |
| 12 | 850 | 600 | 1.0 | >10$^{10}$ | A |
| 13* | 1160 | immeasurable | | | |
| 14* | 1020 | 1000 | 1.0 | <10$^6$ | D |

From the results shown in Table 1B, it will be seen that the monolithic ceramic capacitors according to the present invention have a high insulating resistance of not less than 10$^{10}$ Ωcm and a low sintering temperature of not more than 1050° C. Further, the monolithic ceramic capacitors of the present invention possess low dielectric loss, and improved temperature characteristics of capacitance even if they are produced by firing in a reducing atmosphere. Thus, the present invention makes it possible to produce monolithic ceramic capacitors comprising internal electrodes of copper or a copper alloy.

EXAMPLE 2

Using the same raw materials as those employed in Example 1, there were prepared powdered basic compositions having a composition shown in Table 2A in the same manner as Example 1.

Separate from the above, using the same raw materials as those employed in Example 1, there was prepared powder of an antireducing agent consisting of 5 mol % of Li$_2$O, 15 mol % of BaO, 15 mol % of CaO, 10 mol %, of SrO, 5 mol % of MgO, 20 mol % of $B_2O_3$ and 30 mol % of $SiO_2$, in the same manner as Example 1.

Using each basic composition and the antireducing agent thus obtained, monolithic ceramic capacitors were prepared in the same manner as Example 1.

For each monolithic ceramic capacitor, the electrical characteristics were measured in the same manner as Example 1. Results are shown in Table 2B.

TABLE 2A

| No. | dielectric material (wt %) | | Basic composition (wt %) | | | | | |
|---|---|---|---|---|---|---|---|---|
| | Y | X | $BaTiO_3$ | $Bi_2O_3$ | $TiO_2$ | M | $Pb_3O_4$ | $Nb_2O_5$ |
| 15 | 2 | 98 | 86.1 | 6.9 | 1.9 | $CeO_2$: 0.9 | 2.6 | 1.6 |
| 16 | 2 | 98 | 84.4 | 6.8 | 1.9 | $CeO_2$: 0.8 | 4.2 | 1.9 |
| 17 | 2 | 98 | 87.3 | 7.0 | 1.9 | $CeO_2$: 2.2 | 0.9 | 0.7 |
| 18 | 2 | 98 | 84.6 | 8.0 | 2.7 | $CeO_2$: 0.8 | 2.3 | 1.1 |
| 19 | 2 | 98 | 83.2 | 8.3 | 1.1 | $CeO_2$: 2.3 | 3.3 | 1.8 |
| 20 | 4 | 96 | 85.3 | 8.5 | 2.7 | $CeO_2$: 0.6 | 1.3 | 1.6 |
| 21 | 4 | 96 | 82.4 | 8.2 | 2.6 | $CeO_2$: 3.0 | 2.2 | 1.6 |
| 22 | 4 | 96 | 86.0 | 8.6 | 2.8 | $CeO_2$: 1.3 | 0.4 | 0.9 |
| 23 | 4 | 96 | 84.2 | 8.4 | 2.7 | $CeO_2$: 1.7 | 2.3 | 0.7 |
| 24 | 4 | 96 | 83.3 | 8.3 | 2.7 | $CeO_2$: 1.3 | 2.3 | 2.1 |
| 25 | 8 | 92 | 77.1 | 10.0 | 3.5 | $CeO_2$: 0.8 | 6.9 | 1.7 |
| 26 | 8 | 92 | 77.1 | 10.0 | 3.5 | $La_2O_3$: 0.8 | 6.9 | 1.7 |
| 27 | 8 | 92 | 77.1 | 10.0 | 3.5 | $Nd_2O_3$: 0.8 | 6.9 | 1.7 |
| 28 | 8 | 92 | 77.1 | 10.0 | 3.5 | $Sm_2O_3$: 0.8 | 6.9 | 1.7 |
| 29 | 8 | 92 | 77.1 | 10.0 | 3.5 | $Y_2O_3$: 0.8 | 6.9 | 1.7 |

TABLE 2B

| No. | Sinter temp. (°C.) | Electric properties | | | |
|---|---|---|---|---|---|
| | | $\epsilon$ | tan δ (%) | ρ (Ωcm) | T.C.C. |
| 15 | 1000 | 1950 | 0.9 | $>10^{10}$ | A |
| 16 | 1010 | 2050 | 1.1 | $>10^{10}$ | B |
| 17 | 1000 | 1800 | 1.0 | $>10^{10}$ | B |
| 18 | 1020 | 2000 | 1.0 | $>10^{10}$ | B |
| 19 | 1010 | 1900 | 1.2 | $>10^{10}$ | A |
| 20 | 930 | 1500 | 0.9 | $>10^{10}$ | A |
| 21 | 920 | 1450 | 1.0 | $>10^{10}$ | A |
| 22 | 920 | 1600 | 1.0 | $>10^{10}$ | A |
| 23 | 970 | 1700 | 1.1 | $>10^{10}$ | B |
| 24 | 930 | 1450 | 0.7 | $>10^{10}$ | A |
| 25 | 920 | 1250 | 1.0 | $>10^{10}$ | B |
| 26 | 910 | 1200 | 1.1 | $>10^{10}$ | B |
| 27 | 910 | 1200 | 1.1 | $>10^{10}$ | B |
| 28 | 910 | 1250 | 1.0 | $>10^{10}$ | B |
| 29 | 920 | 1250 | 0.9 | $>10^{10}$ | B |

As will be understood from the results shown in Table 2B, the monolithic ceramic capacitors according to the present invention have a high insulating resistance of not less than $10^{10}$ Ωcm and a low sintering temperature of not more than 1250° C. Further, the monolithic ceramic capacitors of the present invention possess low dielectric loss, improved temperature characteristics of capacitance.

EXAMPLE 3

Using powder of $MnO_2$, $BaCO_3$, $CaCO_3$, $SrCO_3$, $MgCO_3$, $B_2O_3$ and $SiO_2$ as raw materials, there were prepared antireducing agents each having a composition shown in Table 3A, in the same manner as Example 1.

Each antireducing agent was mixed with the powdered basic composition prepared in Example 1 in the ratio shown in Table 3A. Using the resultant mixture, monolithic ceramic capacitors were prepared in the same manner as Example 1.

For each monolithic ceramic capacitor, the electrical characteristics were measured in the same manner as Example 1. Results are shown in Table 3B.

TABLE 3A

| No. | dielectric material (wt %) | | Antireducing agent (mol %) | | | | | | |
|---|---|---|---|---|---|---|---|---|---|
| | X | Y | $MnO_2$ | BaO | CaO | SrO | MgO | $B_2O_3$ | $SiO_2$ |
| 30 | 98 | 2 | 6 | 54 | 0 | 0 | 0 | 20 | 20 |
| 31 | 98 | 2 | 5 | 5 | 5 | 5 | 5 | 25 | 50 |
| 32 | 98 | 2 | 5 | 10 | 10 | 5 | 5 | 35 | 30 |
| 33 | 98 | 2 | 6 | 0 | 10 | 0 | 0 | 34 | 50 |
| 34 | 98 | 2 | 20 | 5 | 5 | 5 | 5 | 30 | 30 |
| 35 | 98 | 2 | 5 | 15 | 15 | 10 | 5 | 20 | 30 |
| 36 | 96 | 4 | 5 | 15 | 15 | 10 | 5 | 20 | 30 |
| 37 | 94 | 6 | 5 | 15 | 15 | 10 | 5 | 20 | 30 |
| 38 | 92 | 8 | 5 | 15 | 15 | 10 | 5 | 20 | 30 |
| 39 | 90 | 10 | 5 | 15 | 15 | 10 | 5 | 20 | 30 |
| 40 | 85 | 15 | 5 | 15 | 15 | 10 | 5 | 20 | 30 |
| 41 | 80 | 20 | 5 | 15 | 15 | 10 | 5 | 20 | 30 |

TABLE 3B

| No. | Sinter temp. (°C.) | Electric properties | | | |
|---|---|---|---|---|---|
| | | $\epsilon$ | tan δ (%) | ρ (Ωcm) | T.C.C. |
| 30 | 1020 | 2300 | 0.9 | $>10^{10}$ | B |
| 31 | 1040 | 2100 | 1.1 | $>10^{10}$ | B |
| 32 | 1010 | 2100 | 1.0 | $>10^{10}$ | B |
| 33 | 1000 | 2000 | 1.0 | $>10^{10}$ | B |
| 34 | 1010 | 1900 | 1.3 | $>10^{10}$ | B |
| 35 | 1010 | 2200 | 1.5 | $>10^{10}$ | B |
| 36 | 980 | 1700 | 1.0 | $>10^{10}$ | B |
| 37 | 960 | 1500 | 1.0 | $>10^{10}$ | A |
| 38 | 950 | 1200 | 0.9 | $>10^{10}$ | A |
| 39 | 900 | 1000 | 0.8 | $>10^{10}$ | A |
| 40 | 870 | 800 | 0.8 | $>10^{10}$ | A |
| 41 | 850 | 600 | 0.7 | $>10^{10}$ | A |

As will be understood from the results shown in Table 3B, the antireducing agent of a $MnO_2$—BaO—CaO—SrO—MgO—$B_2O_3$—$SiO_2$ system has the same effects on the electric properties of the dielectric ceramic composition as that the antireducing agent of a $Li_2O$—BaO—CaO—SrO—MgO—$B_2O_3$—$SiO_2$ system has. That is, the monolithic ceramic capacitors according to the present invention have a high insulating resistance of not less than $10^{10}$ Ωcm, a low sintering temperature of not more than 1050° C., low dielectric loss of not more than 1.5%, improved temperature characteristics of capacitance.

EXAMPLE 4

Using ZnO, $BaCO_3$, $CaCO_3$, $SrCO_3$, MgO, $B_2O_3$, $SiO_2$ as raw materials, there were prepared antireducing agents each having a composition shown in Table 4A, in the same manner as Example 1.

Each antireducing agent was mixed with the powdered basic composition prepared in Example 1 in the ratio shown in Table 3A. Using the resultant mixture, monolithic ceramic capacitors were prepared in the same manner as Example 1.

For each monolithic ceramic capacitor, the electrical characteristics were measured in the same manner as Example 1. Results are shown in Table 4B.

TABLE 4A

| No. | dielectric material (wt %) | | Antireducing agent (mol %) | | | | | | |
|---|---|---|---|---|---|---|---|---|---|
| | X | Y | ZnO | BaO | CaO | SrO | MgO | $B_2O_3$ | $SiO_2$ |
| 42 | 98 | 2 | 6 | 54 | 0 | 0 | 0 | 20 | 20 |
| 43 | 98 | 2 | 5 | 5 | 5 | 5 | 5 | 25 | 50 |
| 44 | 98 | 2 | 5 | 10 | 10 | 5 | 5 | 35 | 30 |
| 45 | 98 | 2 | 6 | 0 | 10 | 0 | 0 | 34 | 50 |
| 46 | 98 | 2 | 20 | 5 | 5 | 5 | 5 | 30 | 30 |
| 47 | 98 | 2 | 5 | 15 | 15 | 10 | 5 | 20 | 30 |
| 48 | 96 | 4 | 5 | 15 | 15 | 10 | 5 | 20 | 30 |
| 49 | 94 | 6 | 5 | 15 | 15 | 10 | 5 | 20 | 30 |
| 50 | 92 | 8 | 5 | 15 | 15 | 10 | 5 | 20 | 30 |
| 51 | 90 | 10 | 5 | 15 | 15 | 10 | 5 | 20 | 30 |
| 52 | 85 | 15 | 5 | 15 | 15 | 10 | 5 | 20 | 30 |
| 53 | 80 | 20 | 5 | 15 | 15 | 10 | 5 | 20 | 30 |

TABLE 4B

| No. | Sinter temp. (°C.) | Electric properties | | | |
|---|---|---|---|---|---|
| | | $\epsilon$ | tan δ (%) | ρ (Ωcm) | T.C.C. |
| 42 | 1010 | 2200 | 1.0 | $>10^{10}$ | B |
| 43 | 1030 | 2100 | 1.0 | $>10^{10}$ | B |
| 44 | 1040 | 2100 | 1.1 | $>10^{10}$ | B |
| 45 | 1000 | 2000 | 1.2 | $>10^{10}$ | B |
| 46 | 1000 | 1900 | 1.0 | $>10^{10}$ | B |
| 47 | 1010 | 2100 | 1.3 | $>10^{10}$ | B |
| 48 | 980 | 1800 | 0.9 | $>10^{10}$ | B |
| 49 | 960 | 1500 | 0.9 | $>10^{10}$ | A |
| 50 | 930 | 1200 | 1.0 | $>10^{10}$ | A |
| 51 | 900 | 1000 | 0.8 | $>10^{10}$ | A |
| 52 | 880 | 800 | 0.7 | $>10^{10}$ | A |
| 53 | 850 | 600 | 0.7 | $>10^{10}$ | A |

From the results shown in Table 4B, it will be seen that the monolithic ceramic capacitors according to the present invention have a high insulating resistance of not less than $10^{10}$ Ωcm, a low sintering temperature of not more than 1050° C., low dielectric loss of not more than 1.5%, and improved temperature characteristics of capacitance.

EXAMPLE 5

Using powder of a copper alloy consisting of 5 atomic % of Pt and 95 atomic % of Cu instead of powdered copper, there was prepared a copper alloy paste for internal electrodes in the same manner as Example 1. Using the resultant copper alloy paste and the ceramic green sheets prepared in Example 1, monolithic ceramic capacitors were prepared in the same manner as Example 1.

The measurements of electrical characteristics showed that the monolithic ceramic capacitor comprising internal electrodes of the Pt-Cu alloy possess the same electrical characteristics as those of monolithic ceramic capacitors having internal electrodes of pure copper.

EXAMPLE 6

Using powder of a copper alloy consisting of 8 atomic % of Pd and 92 atomic % of Cu, there was prepared a copper alloy paste for internal electrodes in the same manner as Example 1. Using the resultant copper alloy paste and the ceramic green sheets prepared in Example 1, monolithic ceramic capacitors were prepared in the same manner as Example 1.

The measurements of electrical characteristics showed that the monolithic ceramic capacitor comprising internal electrodes of the Pt—Cu alloy possess the same electrical characteristics as those of monolithic ceramic capacitors having internal electrodes of pure copper.

EXAMPLE 7

The copper alloy paste prepared in Example 1 was added with 5 wt % of the basic composition prepared in Example 1 to prepare a copper alloy paste for internal electrodes. Using the resultant paste and ceramic green sheets prepared in Example 1, monolithic ceramic capacitors were prepared in the same manner as Example 1.

The measurements of electrical characteristics showed that the use of Pt—Cu alloy paste containing a small amount of the dielectric material makes it possible to produce monolithic ceramic capacitors having electrical characteristics similar to those of monolithic ceramic capacitors having the internal electrodes of pure copper.

EXAMPLE 8

The copper alloy paste prepared in Example 1 was added with 3 wt % of the powdered basic composition prepared in Example 1 and 2 wt % of the antireducing agent prepared in Example 2 to prepare a copper alloy paste for internal electrodes. Using the resultant paste and ceramic green sheets prepared in Example 1, monolithic ceramic capacitors were prepared in the same manner as Example 1.

The measurements of electrical characteristics showed that the use of Pt—Cu alloy paste containing a small amount of the ceramic dielectric and antireducing agent makes it possible to produce monolithic ceramic capacitors having the same electrical characteristics as those of monolithic ceramic capacitors having internal electrodes of pure copper.

What is claimed is:

1. A monolithic ceramic capacitor comprising a plurality of dielectric ceramic layers united to one another to form a monolithic body, a plurality of internal electrodes each formed between two adjacent dielectric ceramic layers, and external electrodes formed on opposite sides of said monolithic body and each being connected to alternate internal electrodes, characterized in that said dielectric ceramic layers are made up of a dielectric ceramic composition consisting essentially of a basic composition and an antireducing agent incorporated therein to prevent it from reduction, said basic composition mainly comprising barium titanate and a bismuth compound incorporated therein, and in that said internal electrodes comprise copper or a copper alloy.

2. A monolithic ceramic capacitor according to claim 1 wherein said antireducing agent has a composition expressed by the general formula:

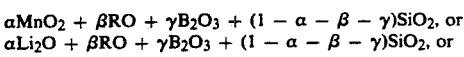

$\alpha MnO_2 + \beta RO + \gamma B_2O_3 + (1 - \alpha - \beta - \gamma)SiO_2$, or
$\alpha Li_2O + \beta RO + \gamma B_2O_3 + (1 - \alpha - \beta - \gamma)SiO_2$, or -continued $$\alpha ZnO + \beta RO + \gamma B_2O_3 + (1 - \alpha - \beta - \gamma)SiO_2$$

wherein RO is at least one oxide selected from the group consisting of MgO, CaO, SrO and BaO, $\alpha$, $\beta$ and $\gamma$ are molar percentages of the respective components and take a value within the following respective ranges, $5 \leq \alpha \leq 20$, $10 \leq \beta \leq 60$, $20 \leq \gamma \leq 35$.

3. A monolithic ceramic capacitor according to claim 1 wherein each said internal electrode contains at least one additive selected from the group consisting of glass frit, powdered dielectric, and antireducing agent.

4. A monolithic ceramic capacitor according to claim 3 wherein the content of said additive is not more than 40 wt %.

5. A monolithic ceramic capacitor according to claim 1 wherein said basic composition has a composition expressed by the general formula:

$$aBaTiO_3 + bBi_2O_3 + cTiO_2 + dM + ePb_3O_4 + fNb_2O_5$$

where M is at least one oxide selected from the group consisting of $La_2O_3$, $CeO_2$, $Nd_2O_3$, $Sm_2O_3$ and $Nd_2O_3$, and a, b, c, d, e and f are weight percentages of the respective components and take a value within the following respective ranges: $60.0 \leq a \leq 98.0$, $1.0 \leq b \leq 15.0$, $0.2 \leq c \leq 20.0$, $0.2 \leq d \leq 8.0$, $0.2 \leq e \leq 15.0$, $0.2 \leq f \leq 5.0$.

6. A monolithic ceramic capacitor according to claim 1 wherein said basic composition is of a $BaTiO_3 + Bi_2O_3 \cdot SnO_2 + Nd_2O_3$ system.

7. A monolithic ceramic capacitor according to claim 1 wherein said basic composition is of a $BaTiO_3 + Bi_2O_3 \cdot ZrO_2 + CeO_2$ system.

8. A monolithic ceramic capacitor according to claim 1 wherein said basic composition is of a $BaTiO_3 + Bi_2O_3 \cdot ZrO_2 + CeO_2$ system.

9. A monolithic ceramic capacitor comprising a plurality of dielectric ceramic layers united to one another to form a monolithic body, a plurality of internal electrodes each formed between two adjacent dielectric ceramic layers, and external electrodes formed on opposite sides of said monolithic body and connected to alternate internal electrodes, wherein:

a) said dielectric ceramic layers consist essentially of (1) a basic dielectric ceramic composition mainly comprising barium titanate and a bismuth compound, and (2) an antireducing agent which gives said basic composition additional resistance to reduction; and b) said internal electrodes comprise copper or a copper alloy.

* * * * *